US009864861B2

(12) United States Patent
Xing et al.

(10) Patent No.: US 9,864,861 B2
(45) Date of Patent: Jan. 9, 2018

(54) OBJECT ORIENTED MARSHALING SCHEME FOR CALLS TO A SECURE REGION

(71) Applicant: Intel Corporation, Santa Clara, CA (US)

(72) Inventors: Bin Cedric Xing, Hillsboro, OR (US); Mark W. Shanahan, Raleigh, NC (US); James D. Beaney, Jr., Raleigh, NC (US)

(73) Assignee: Intel Corporation, Santa Clara, CA (US)

(*) Notice: Subject to any disclaimer, the term of this patent is extended or adjusted under 35 U.S.C. 154(b) by 520 days.

(21) Appl. No.: 14/227,411

(22) Filed: Mar. 27, 2014

(65) Prior Publication Data

US 2015/0278528 A1 Oct. 1, 2015

(51) Int. Cl.
G06F 21/60 (2013.01)
G06F 21/53 (2013.01)

(52) U.S. Cl.
CPC ............ *G06F 21/60* (2013.01); *G06F 21/53* (2013.01)

(58) Field of Classification Search
CPC ...................................................... G06F 21/60
USPC .......................................................... 726/26
See application file for complete search history.

(56) References Cited

U.S. PATENT DOCUMENTS

| 5,857,197 | A  | * | 1/1999  | Mullins  | G06F 17/30607 |
| 6,128,774 | A  | * | 10/2000 | Necula   | G06F 9/44589 717/126 |
| 6,167,565 | A  | * | 12/2000 | Kanamori | G06F 9/547 707/999.103 |
| 6,330,677 | B1 | * | 12/2001 | Madoukh  | G06F 21/445 726/2 |
| 6,446,116 | B1 | * | 9/2002  | Burridge | G06Q 10/10 345/15 |
| 6,519,568 | B1 | * | 2/2003  | Harvey   | G01V 11/002 702/14 |
| 6,594,671 | B1 | * | 7/2003  | Aman     | G06F 9/465 |
| 6,865,607 | B1 | * | 3/2005  | de Jong  | G06F 9/541 709/202 |

(Continued)

FOREIGN PATENT DOCUMENTS

| CN | 103384196 | 11/2013 |
| EP | 3123340 A1 * | 2/2017 |

(Continued)

OTHER PUBLICATIONS

Li Gong, "Enclaves: Enabling Secure Collaboration over the Internet", 1996.*

(Continued)

*Primary Examiner* — O. C. Vostal
(74) *Attorney, Agent, or Firm* — Trop, Pruner & Hu, P.C.

(57) ABSTRACT

A system is disclosed and includes a processor to automatically execute enclave initialization code within a host application at run time of the host application. The enclave initialization code includes marshaling code to create a secure enclave separate from the host application. The marshaling code is generated at build time of the host application. The system also includes a dynamic random access memory (DRAM) including a dedicated DRAM portion to store the secure enclave. Other embodiments are described and claimed.

18 Claims, 8 Drawing Sheets

(56) References Cited

U.S. PATENT DOCUMENTS

| | | | |
|---|---|---|---|
| 6,898,710 B1* | 5/2005 | Aull | H04L 63/0272 713/182 |
| 6,941,556 B1* | 9/2005 | Kessler | G06F 9/548 719/316 |
| 7,730,522 B2* | 6/2010 | Bernabeu-Aubon | G06F 9/548 709/215 |
| 7,930,340 B2* | 4/2011 | Arunachalam | G06Q 20/04 709/202 |
| 8,041,949 B2* | 10/2011 | Isozaki | H04L 63/0442 379/56.3 |
| 8,255,607 B2* | 8/2012 | Jones | G06F 13/4027 710/316 |
| 2001/0037417 A1* | 11/2001 | Meyer | G06F 8/76 719/332 |
| 2002/0019843 A1* | 2/2002 | Killian | G06F 9/465 718/102 |
| 2002/0029280 A1* | 3/2002 | Holden | G06F 21/31 709/229 |
| 2003/0105883 A1* | 6/2003 | Gibbons | G06F 9/541 719/313 |
| 2003/0144894 A1* | 7/2003 | Robertson | G06Q 10/06 709/226 |
| 2003/0158998 A1 | 8/2003 | Smith | |
| 2005/0044197 A1* | 2/2005 | Lai | G06Q 10/10 709/223 |
| 2005/0149726 A1* | 7/2005 | Joshi | G06F 21/51 713/164 |
| 2006/0031472 A1* | 2/2006 | Rajavelu | H04L 63/0263 709/224 |
| 2006/0101412 A1* | 5/2006 | Lev | G06F 9/548 717/127 |
| 2006/0116991 A1* | 6/2006 | Calderwood | G06F 9/547 |
| 2006/0277289 A1* | 12/2006 | Bayliss | H04L 67/12 709/223 |
| 2007/0160198 A1 | 7/2007 | Orsini et al. | |
| 2007/0162466 A1* | 7/2007 | Claussen | G06F 17/2247 |
| 2007/0234412 A1* | 10/2007 | Smith | G06F 21/53 726/11 |
| 2007/0263658 A1* | 11/2007 | Ung | H04L 63/105 370/466 |
| 2008/0163265 A1* | 7/2008 | Flora | G06F 8/4434 719/328 |
| 2009/0063665 A1* | 3/2009 | Bagepalli | H04L 63/166 709/222 |
| 2009/0168758 A1* | 7/2009 | Apelqvist | H04L 29/12066 370/352 |
| 2009/0293066 A1* | 11/2009 | Low | G06F 9/548 719/316 |
| 2010/0005449 A1* | 1/2010 | Karabulut | G06F 21/52 717/120 |
| 2010/0031342 A1* | 2/2010 | Vogsland | H04L 67/38 726/17 |
| 2011/0067105 A1 | 3/2011 | Wolfe et al. | |
| 2011/0271327 A1* | 11/2011 | Palmer | G06F 21/629 726/4 |
| 2012/0020374 A1* | 1/2012 | Jonsson | H04L 49/205 370/419 |
| 2012/0023318 A1 | 1/2012 | Xing et al. | |
| 2012/0159184 A1* | 6/2012 | Johnson | G06F 12/1466 713/189 |
| 2012/0163589 A1* | 6/2012 | Johnson | G06F 21/10 380/30 |
| 2012/0198538 A1* | 8/2012 | Spring | G06F 21/78 726/9 |
| 2012/0303854 A1* | 11/2012 | Karslioglu | G06F 13/36 710/306 |
| 2013/0024593 A1* | 1/2013 | Hauck | H04N 21/43632 710/306 |
| 2013/0031454 A1* | 1/2013 | Griffiths | G06F 17/241 715/230 |
| 2013/0097698 A1* | 4/2013 | Taveau | G06Q 30/06 726/19 |
| 2013/0117804 A1* | 5/2013 | Chawla | H04L 63/102 726/1 |
| 2013/0152153 A1* | 6/2013 | Weiser | H04L 63/0236 726/1 |
| 2013/0159726 A1* | 6/2013 | McKeen | G06F 21/72 713/189 |
| 2013/0173719 A1* | 7/2013 | Ahmed | H04L 67/12 709/206 |
| 2013/0232345 A1 | 9/2013 | Johnson et al. | |
| 2013/0312117 A1* | 11/2013 | Sapp, II | G06F 21/62 726/30 |
| 2014/0006919 A1* | 1/2014 | He | G06F 17/241 715/230 |
| 2014/0040973 A1* | 2/2014 | Bhat | G06F 21/10 726/1 |
| 2014/0189246 A1* | 7/2014 | Xing | G06F 21/53 711/135 |
| 2014/0189326 A1* | 7/2014 | Leslie | G06F 9/30047 712/225 |
| 2014/0201841 A1* | 7/2014 | Deshpande | G06F 21/577 726/25 |
| 2014/0281753 A1* | 9/2014 | Wagh | G06F 13/4295 714/56 |
| 2014/0282391 A1* | 9/2014 | Doughan | G06F 9/4428 717/116 |
| 2014/0293093 A1* | 10/2014 | Seo | H04N 5/262 348/240.2 |
| 2014/0337983 A1* | 11/2014 | Kang | G06F 21/60 726/26 |
| 2015/0033012 A1* | 1/2015 | Scarlata | H04L 9/3242 713/161 |
| 2015/0033034 A1* | 1/2015 | Gerzon | H04L 9/3239 713/190 |
| 2015/0121536 A1* | 4/2015 | Xing | G06F 21/12 726/26 |
| 2015/0178226 A1* | 6/2015 | Scarlata | G06F 12/1466 711/163 |
| 2015/0188710 A1* | 7/2015 | Johnson | G06F 21/53 713/176 |
| 2015/0269193 A1* | 9/2015 | King | G06F 17/30923 707/694 |
| 2015/0278520 A1* | 10/2015 | Mraz | G06F 21/565 726/23 |
| 2016/0283404 A1* | 9/2016 | Xing | G06F 21/53 |
| 2017/0039368 A1* | 2/2017 | Grobman | G06F 21/31 |

FOREIGN PATENT DOCUMENTS

| | | |
|---|---|---|
| KR | 2012-0099472 | 9/2012 |
| KR | 20120099472 A * | 9/2012 |
| TW | 200306473 | 11/2003 |
| TW | 201224918 | 6/2012 |
| WO | 2011078855 | 6/2011 |
| WO | WO 2011078855 A9 * | 9/2011 |
| WO | 2012170485 | 12/2012 |

OTHER PUBLICATIONS

Owen et al., "PRISM: Program Replication and Integration for Seamless MILS", 2011.*

Anati et al., "Innovative Technology for CPU Based Attestation and Sealing", 2013.*

McGregor, "DIS-XML: Moving DIS to Open Data Exchange Standards", 2006.*

Jiang et al., "CDLChecker: A WS-CDL Analysis Tool", 2012.*

Shands et al., "Secure Virtual Enclaves: Supporting Coalition Use of Distributed Application Technologies", 2000.*

Ort et al., "Java Architecture for XML Binding (JAXB)", 2003.*

Stackoverflow, "marshalling", 2016.*

Etherington, "Apple Details Touch ID and The A7's Secure Enclave in Updated iOS Security Document", 2014.* iPhone Wiki, "Secure Enclave", 2017.*

International Searching Authority, "Notification of Transmittal of the International Search Report and the Written Opinion of the International Searching Authority," dated Jun. 23, 2015, in Inter- (56) References Cited

OTHER PUBLICATIONS national application No. PCT/US2015/022911.
Taiwan Intellectual Property Office, Official Letter dated Feb. 25, 2016 in Taiwan Patent Application No. 104103471. (Translation Redacted).
Korea Intellectual Property Office, Notice of Preliminary Rejection dated May 22, 2017, in Korean Patent Application No. 2016-7023359.

* cited by examiner

OBJECT ORIENTED MARSHALING SCHEME FOR CALLS TO A SECURE REGION

TECHNICAL FIELD

Embodiments pertain to object oriented marshaling for calls to a secure region.

BACKGROUND

Establishment of a secure enclave (SE) is a technique to provide a secure and isolated execution environment (enclave) for applications to process confidential data. An enclave, due to its isolation, cannot be a complete application alone since it cannot access any system application programming interfaces (APIs) directly. Instead, in order to take advantage of SE technology, an application is typically partitioned, with confidential data processing logic hosted inside the enclave and non-confidential data processing logic outside of the enclave.

With the advent of mobile operating systems comes a question of how to make SE technology accessible in object oriented programming (OOP) languages (e.g., Java®) popular with developers.

DETAILED DESCRIPTION

An interface definition language (IDL) is proposed to support OOP languages, e.g., Java® and other OOP languages in instantiation of one or more secure enclaves that may be communicated with by a non-secure host application. The IDL is intended to minimize changes to a software vendor's existing code, and is to have low-latency/high-performance characteristics with a relatively simple implementation, e.g., straightforward in logic and small in code size. An additional advantage is that the IDL is to allow generation of glue code to stitch secure classes (e.g., classes to be hosted in an enclave) to other parts of an application, for compatibility with non-SE-enabled platforms. Stitching of secure classes to other parts of the application can relieve software vendors (SVs) from maintaining multiple versions of their applications for different platforms. Additionally, in some embodiments user-visible interfaces are not present, and so user code may be effectively decoupled from underlying marshaling/transportation and its associated code.

According to embodiments of the present invention, marshaling code may be generated and invoked statically. Advantages to statically generated and invoked marshaling code may include reduced latency of static marshaling code as compared with other coding techniques, reduced chance of attack by a rogue client to cause unexpected code execution on a remote site as compared with dynamic creation of objects on the remote site, reduced size of static marshaling code compared with other coding methods, and ability to make a descendent of a remote interface that can be marshaled ("marshalable"). Interface inheritance is supported by embodiments of the present invention.

A concept of root object and root interface is introduced into the IDL, which allows an enclave (also "server" herein, e.g., secure portion of memory) in e.g., a dedicated portion of memory, to be created (e.g., passively) by a host application, (e.g., client). Further, a "wrapper" class can be generated automatically by an annotation processor (e.g., the annotation processor may be invoked by a compiler) to bypass marshaling, which may allow an SE-enabled application to run on non-SE-enabled hardware without modification of application source code.

In embodiments of the present invention, an enclave is abstracted as a single object, e.g., root object that exposes a corresponding interface, e.g., root interface. The root object serves as the entry point of the enclave. The root object, along with a proxy/bridge pair of the root interface, may be created automatically, e.g., at run time of the application, by enclave initialization code. Depending on configuration, the root interface may be passed directly to a caller without instantiation of the proxy—bridge pair. A wrapper class may instantiate the root object, which implements the root interface to enable an SE-application to access a secure enclave on non-SE-enabled hardware without the proxy/bridge pair.

Once the root object is instantiated, more objects/interfaces can be passed to/from the enclave, e.g., by passing the object/interface as an argument of any method of the root interface, or by returning the object/interface via any method of the root interface. In order to marshal an interface (e.g., allow the caller in the application space with the callee in enclave space, or vice versa) marshaling code is to be created, e.g., at build-time by the annotation processor. In an embodiment, the annotation processor may be a compiler plug-in module.

For example, a developer may specify the interface to be marshaled using in-source annotation, which may be processed by the annotation processor to generate proxy/bridge classes for the annotated interface. A proxy is an implementation of the annotated interface. The proxy may package parameters of transportation whenever a method is called. A bridge is a counterpart of the proxy. The bridge is to unpack parameters received from a transportation layer and to invoke implementation of the annotated interface.

Creation/destruction of proxy/bridge objects may be managed by a transportation layer. The transportation layer may be abstracted as a channel interface. The transportation layer may be responsible for passing data packages, as well as being responsible for matching proxies with bridges. A channel is also "marshal-able," e.g., different implementations of the channel can be stacked transparently. Stacking channels may be useful for inter-enclave procedure calls.

Terminologies used herein include the following:
interface—class that includes virtual methods but no data members.

proxy—generated class that implements a corresponding interface. All methods are implemented as "marshaling code", e.g., the code to package the input parameters into a data packet that is to be "un-marshaled" by a bridge. If a method has a return value, the proxy implementation also "un-marshals" the return value (that has been marshaled by the bridge) before returning to its caller.

bridge—counterpart of a proxy. The bridge unpacks the input parameters, invokes the interface implementation, and marshals the return value back to a data packet.

root object—object to be instantiated when an enclave is being initialized. The root object implements at least one marshal-able interface (e.g., root interface), for which the proxy and bridge will also be instantiated and paired by enclave initialization code.

root class—data type of the root object root interface—a marshalable interface implemented by the root class. Its proxy and bridge are instantiated/paired by the enclave initialization code.

channel—a transport layer abstraction. A channel is a class implementing a channel interface to move packets between proxies and bridges. The channel interface itself is also marshal-able, e.g., a proxy of a channel may be created over another channel. In other words, channels are stackable, which may be useful in inter-enclave calls.

Figure 1:
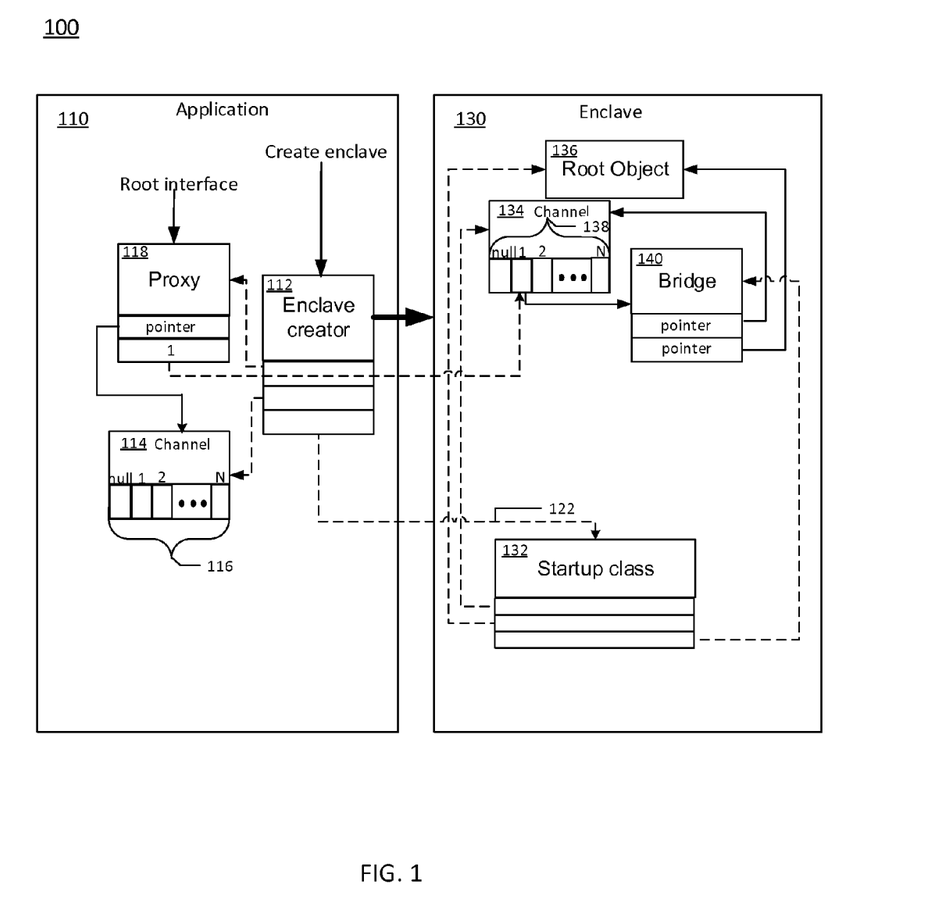
FIG. 1 is a block diagram of a system to access secure data, according to an embodiment of the present invention.

FIG. 1 is a block diagram of a system to access secure data, according to an embodiment of the present invention. The system 100 includes an application 110 and an enclave 130 that are coupled via a channel 114/134. In an embodiment, the application 110 is an untrusted space and the enclave 130 is a trusted space.

In an embodiment, the enclave 130 is abstracted as a root object 136 that implements a root interface (e.g., by upcasting a proxy 118 associated with the root interface). The application 110, before making use of any capabilities exposed by the enclave 130, is to instantiate the enclave 130 and is to create the proxy 118 for the root interface. During enclave instantiation, both the root object 136 and its bridge 140 are created inside the enclave 130 so that the application 110 can start to interact with the enclave 130 through the root interface.

In operation, the application 110 brings the enclave 130 into existence by a call to an enclave creator 112. The enclave creator 112 is an auto-generated function (e.g., created at build time of the application 110) that encapsulates instructions to load and initialize the enclave 130. Enclave creator 112 returns the proxy 118, which is an implementation of the root interface.

In order to allow for loading of multiple enclaves inside the same application, each enclave is to have a unique name. For example, a developer is permitted to name an enclave by a string, from which names are generated for both the enclave creator 112 and an enclave image file name. In an embodiment (e.g., for some languages, such as Java®), no standalone function is permitted, and therefore the enclave creator 112 is generated as a class with a single static function. For example, given an enclave named SomeEnclave, the enclave creator 112 may be SomeEnclave_Creator.createEnclave( ). In other embodiments (e.g., other languages, such as C++) standalone functions are permitted.

The enclave creator 112 can load and invoke initialization code of the enclave 130. For example, in an example that uses Java®, a startup class may be initialized by a class loader as part of enclave global initialization. A dotted line 122 connects the enclave creator 112 to a startup class 132.

In an example that uses C++, the startup class 132 includes static objects whose constructors are invoked as part of an initialization process.

When initialization of the enclave 130 is finished, the enclave creator 112 instantiates a channel object 114 for the application 110. The channel object 114 is to remember which enclave it is bound to, e.g., by storing in a data member, an enclave identification (EID) or other enclave handle/identifier, e.g., returned by an untrusted run-time service (uRTS).

The channel object 114 may maintain, in a register 116, a list of bridges that can be referenced by the enclave 130. For example, bridge 140 may be referenced by a corresponding identifier (e.g., for bridge 140, the identifier can be 1) as seen in proxy 118. The identifier references an address of bridge 140 stored in array 138 of channel 134. (In an embodiment, index 0 (zero) is reserved as a NULL reference, e.g., in a newly created channel, and the corresponding register entry is empty.)

The enclave creator 112 creates the proxy 118 for the root interface. Proxy 118 matches with the bridge 140 in enclave 130. The creation of the proxy 118 is matched by creation of the bridge 140 on the enclave side. When initialization on the application side (e.g., application 110) is completed, the proxy 118 may be up-cast to the root interface before being returned to a caller. The application 110 can then call into methods of the root interface to interact with the enclave 130.

On the enclave side (e.g., enclave 130), an enclave startup class 132 is an auto-generated class that creates three objects: a channel object 134, a root object 136, and a bridge 140.

A manner in which the startup class 132 is invoked depends on a trusted run-time service (tRTS) implementation. In order to allow auto-generated code to create an instance of the root object 136, the root class may have a default constructor.

Similar to the channel object 114 in the application 110, the enclave 130 also maintains an array 138 of bridges, which is initialized to empty. The bridge 140 is then created for the root object 136. The bridge 140 maintains a reference to the underlying channel object 134, which will be used to marshal interfaces as values are returned. The bridge 140 is referenced in the channel's array 138 of bridges. The identifier of the bridge 140 (in array 138) is to be the same identifier assumed by the application 110, e.g., in proxy 118. In an example shown in FIG. 1, an identifier of 1 is assigned to the bridge 140 so that the bridge 140 is correctly referenced by its corresponding proxy 118.

In the event that a secure enclave (SE) is not supported by underlying hardware, the enclave 130 can be embedded into the application 110 by a modified enclave creator to instantiate the root class directly. That is, instead of creating channel object 114 and proxy 118, root object 136 is created and up-cast to a root interface, and then is returned. Such a modified enclave creator can also be generated automatically by an annotation processor, discussed below.

A typical remote procedure call (RPC) platform includes an IDL grammar for defining interfaces, an IDL compiler to compile interface definitions into language-specific definitions, and marshaling code. Typically, a component that implements the interface is to use the output of the IDL compiler to tie the component to the interface.

In embodiments of the present invention (e.g., embodiments including FIG. 1), instead of defining a new grammar that may be used to define an interface in a separate file, a set of annotations may be used at build-time to mark, e.g., directly in a Java® source file, the interfaces that are remotely accessible. Then the IDL compiler may be implemented as an annotation processor, which may be invoked by a compiler (e.g., Java® compiler) whenever specific annotations are encountered by the compiler.

In certain object oriented languages, e.g., Java®, the annotation processor may make use of a "mirror" capability to analyze the classes and generate proper marshaling code. The class that implements a remotely accessible interface does not need to interact with the marshaling code.

A description is presented below of a methodology for determining marshal-ability of a given type, followed by a description of how marshaling code is generated and organized, and a list of annotations and their purpose.

For embodiments of the present invention, rules for determining marshal-ability include the following rules:

1. All primitive data types (e.g., integers, floating point, etc.) are marshal-able.

2. A composite data type (i.e. array/structure) is marshal-able if all of its components are marshal-able. A method/function is considered marshal-able if its return type and all of its parameter types are marshal-able. An interface is marshal-able if all of its methods are marshal-able.

Marshaling code can be generated by application of the above rules recursively, according to the type:

1. Primitive types have fixed sizes, and so marshaling a primitive type can be accomplished by storing its value in a memory buffer, stream, etc. depending on embodiment.

2. Marshaling code for a composite type is a function that includes an ordered list of marshaling operations for each component. A marshaling function can be named after the type it marshals. When a component is a composite type, the marshaling operation for that component can be a call into the marshaling function of the component type.

3. Marshaling code for a method/function can be a marshaling function that has a same signature as the method/function being marshaled. The marshaling function is a list of marshaling operations for each of its parameters, followed by a call into a real function, and an un-marshaling operation for a return type. Note that an instance method within a class can also be treated as a conventional function, with the first parameter being a reference (e.g., pointer) to a memory address of another variable, e.g., a pointer labeled "this". Typically the this pointer is an interface pointer.

4. An interface can be marshaled as a proxy class implementing the interface.

Each method of the proxy class can be the marshaling code for the method in the interface. The proxy class also contains an identifier that ties the proxy to the actual implementation of the interface on the remote side.

Embodiments of the present invention support interfaces and composite types such as arrays and structures. Embodiments of the present invention may not support classes in general, due to polymorphism, e.g., an instance of a derived class may be marshaled as its super class mistakenly, and error check cannot be done at build time.

Some embodiments of the present invention may be applied to every interface and class of a given application (e.g., a Java® application) to determine if the given interface/class is marshal-able, and to generate marshaling code along the way.

In some embodiments, annotations are used to trigger processing of specific interfaces/classes chosen by a developer. Annotations may include the following (please note that the names of the annotations are for demonstration purposes only, and the actual names/signatures of the annotations may be substantially different from those listed below):

@Interface This annotation is to mark an interface as marshal-able and to indicate to the annotation processor that a proxy class shall be generated for the interface. Calls to any of the methods of the interface will be marshaled and carried out on a remote site.

@Structure(enforceFinalCheck=true/false) This annotation is to mark a class as a marshal-able data structure and to indicate to the annotation processor that a marshaling function shall be generated for this class. Calls to any of the methods are not marshaled, and therefore will be carried out locally. (This annotation is not essential, since the annotation process generates marshaling code for all classes appearing in a method's prototype in any case.) In practice, use of @Structure can avoid duplication of marshaling code and can simplify the annotation processor. Additionally, use of @Structure can prevent classes containing confidential data from being passed by mistake, because in this case any marshal-able classes are explicitly annotated by the developer.

In order to avoid errors and confusions caused by polymorphism, in an embodiment the annotated class may be declared as "final" to eliminate any possibility of a sub-class. Another embodiment can then relax a declaration of finality, per the developer's request, by reporting a warning instead of an error whenever a non-final class is annotated by @Structure. Such relaxation may be specified by an optional argument enforceFinalCheck, which defaults to true, and which may be overridden by the developer.

@Out This annotation is applicable to parameters of methods. An annotated parameter is to be of a type annotated by @Structure and indicates to the annotation processor that the annotated parameter may be updated by a callee, and that an updated copy is to be marshaled back to a caller.

@RootClass(RootInterface="InterfaceName") This annotation specifies the Root Class and the Root Interface it implements. This annotation is one of several possible ways to specify the root class and root interface for an enclave, and may be done (or not) via annotation. For example, an embodiment may opt to specify the root class and root interface in the linker's command line.

@SEClass(trusted=true/false) This annotation is not part of the interface definition. Rather, it is to facilitate error checking (e.g., by a linker such as Java® linker). In an embodiment, a class marked with "trusted=true" shall only appear in an enclave, while a class marked with "trusted=false" does not appear in any enclave.

Figure 2:
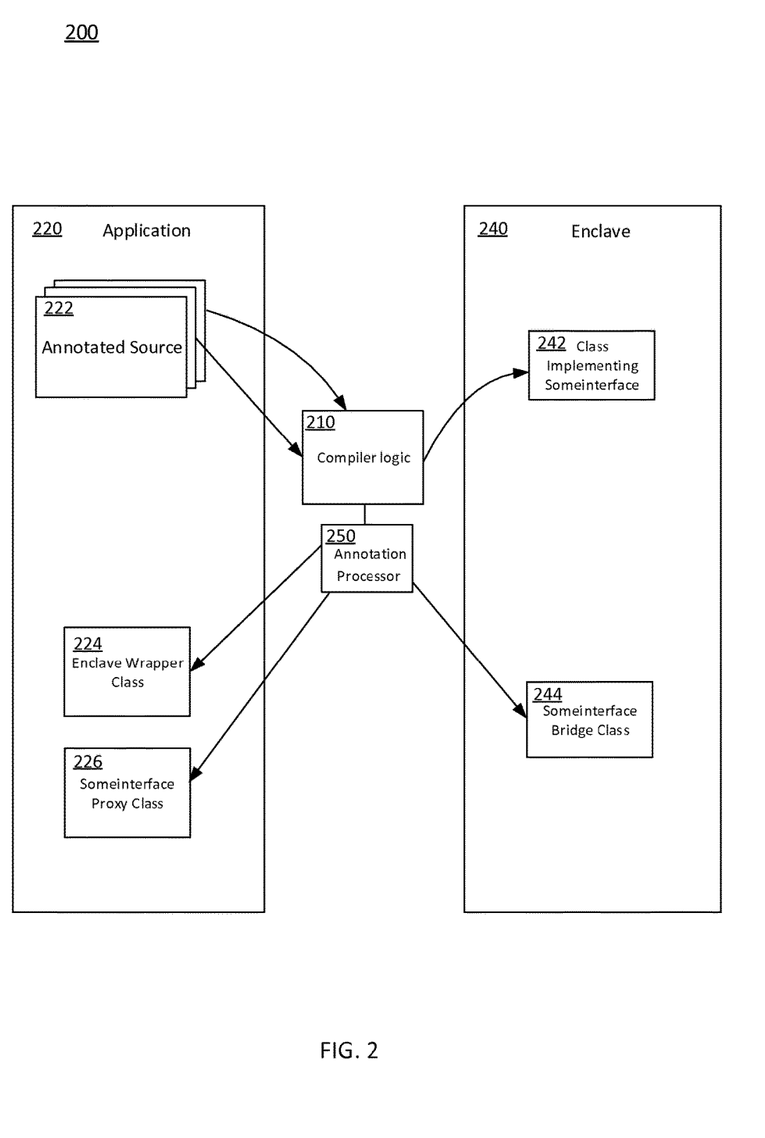
FIG. 2 is a block diagram of a system that invokes an annotation processor, according to another embodiment of the present invention.

FIG. 2 is a block diagram 200 of a system that invokes an annotation processor, according to another embodiment of the present invention. An annotation processor 250 (e.g., implemented in software) may be invoked by compiler logic 210 (also "compiler" herein) when annotated source code 222 is compiled to produce object code. The annotated source code 222 may include an annotated interface (e.g., SomeInterface). The compiler logic 210 may be implemented in hardware, software, firmware, or a combination thereof.

When the compiler 210 encounters an annotation, (e.g., any annotation, such as @Interface), the compiler 210 may invoke the annotation processor 250. The annotation processor 250 may determine marshal-ability of the annotated interface and may generate marshaling code.

A class 242 (e.g., representing a task to be accomplished) inside the enclave 240 may have implemented SomeInterface and wishes to expose SomeInterface to the host application 220. Because the implementation of SomeInterface resides in the enclave while its client resides in the (untrusted) application 220, a linker (not shown) may place proxy class 226 in the application 220 to marshal method calls, and may also place bridge class 244 in the enclave 240 to un-marshal method calls.

Enclave wrapper class 224 is a piece of glue code to bypass a marshaling/transportation layer, and is included for compatibility with non-SE-enabled platforms. In some embodiments, the enclave wrapper class 224 is generated for the root class only.

A proxy (e.g., proxy class 226) may implement a marshalable interface, which allows a caller to call into the proxy as if a caller is directly calling an object associated with the proxy. The proxy methods marshal the parameters and then employ a channel to invoke a method remotely through a corresponding bridge (e.g., Someinterface bridge class 244), which is identified by a channel/bridge ID pair, where channel is a reference to a channel object and bridge ID is channel-specific.

The bridge (e.g., Someinterface bridge class 244) may bridge each marshal-able interface to an actual class and methods that implement the interface. A bridge corresponding to a specific proxy is instantiated whenever a new interface is marshaled through the channel. The bridge may have a bridge method for each method in the marshaled interface.

Proxies and bridges may be created/destroyed dynamically, except for the proxy and bridge for the root interface, which are created as part of an initialization sequence. Typically, a life cycle of each proxy may be controlled by a garbage collector, and when a proxy is destroyed, the channel releases a corresponding bridge.

In an embodiment, a reference-counting scheme may be employed on the bridges. That is, a new proxy instance is created whenever a given interface is marshaled. However, multiple proxy instances of the same remote object may share the same bridge instance, which is reference-counted and which will be destroyed after all proxy instances are destroyed.

In another embodiment, proxies can be tracked and reference-counted by the channel. In this embodiment, the same proxy instance will be returned regardless of how many times the same remote object is marshaled. Note that in this embodiment, the references to proxy by channel are "weak," or else the proxies would not be garbage collected, e.g., references to proxies by channel would prevent the proxies from being garbage collected.

Because of a one-to-one correspondence between the proxy classes and the bridge classes, the bridge may have a priori knowledge of how to un-marshal parameters for each method call. Thus, the proxy need only marshal the data in the parameters, without other information (e.g., parameter type information). Marshaling only the data in the parameters may result in a low run-time overhead.

Both the proxy and bridge may be auto-generated from a user defined interface definition and a tool (e.g., the annotation processor described above). The resultant code may be capable of marshaling both interfaces and complex objects and a user (e.g., developer) can avoid manually writing of marshaling and un-marshaling code provided in the proxies and the bridges.

Furthermore, a definition of each interface permits flexibility by the user as to how parameters are marshaled. For example, the user can define the interface such that the interface bypasses marshaling unneeded object members.

The channel may be implemented to invoke remote methods, manage bridge objects, and manage a transport mechanism between the local client and a remote service. It is to be noted that in some embodiments the remote service does not need to be running in a remote process. Instead, the remote service may be a local entity isolated by programming constructs, such as an enclave.

A pair of channel objects may be instantiated for each client/server interface. Although each client/server binding implies a primary proxy (e.g., proxy for the root interface) on the client and a primary bridge (e.g., bridge for the root object) in the server (enclave), other proxy/bridge pairs can be created via passing a reference to an interface between the client and server. Thus, interfaces may operate in any direction, e.g., client to server (e.g., application to enclave) or server to client (e.g., enclave to application). The interfaces may include the channel interface itself because the channel interface to one server may be marshaled to another server, creating a stackable transportation layer.

The channel class employs a transport mechanism to communicate between the client and the server, which implies a unique implementation of the channel interface between the local and remote processes for each type of channel. The transport mechanism is responsible for the communication between the client and server and may be platform specific. In one embodiment, the transport layer uses glue code (e.g., C/C++ glue code), which employs shared memory and a direct call mechanism accessed through, e.g., a native interface (e.g., Java® interface).

Internally, the channel implementation keeps track of any marshaled interfaces by maintaining references for local bridges and creating a unique identifier (ID) for each local bridge when the local bridge is registered with the channel. This allows the channel to translate local bridge identifications passed by the remote side to the associated bridge objects and their associated real objects on the local side.

Figure 3:
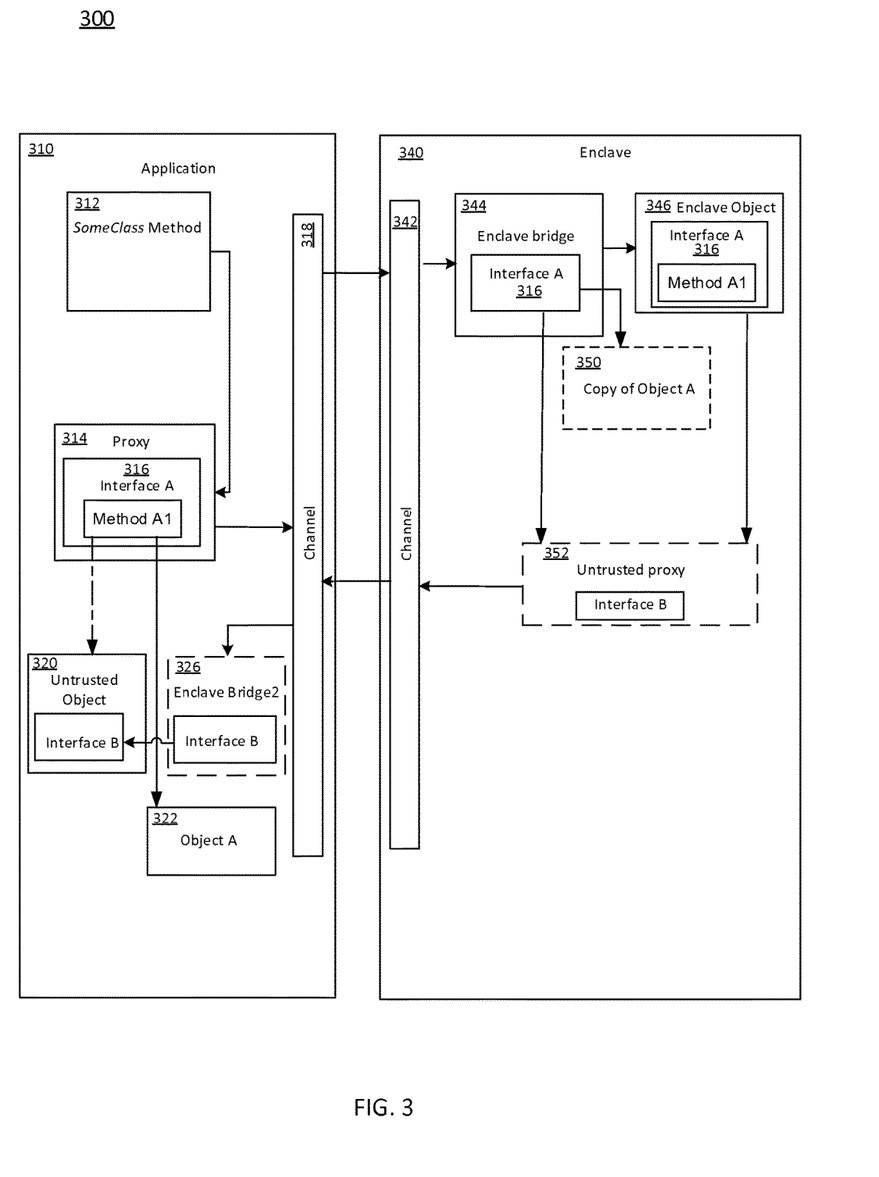
FIG. 3 is a block diagram of a system for data and interface marshaling, according to an embodiment of the present invention.

FIG. 3 is a block diagram of a system 300 for data marshaling and/or interface marshaling, according to an embodiment of the present invention. The system 300 includes an application 310 (e.g., an Android® application) and an enclave 340 (e.g., a secure enclave written in Java®) as a remote process, e.g., isolated from the application code.

The system 300 includes application 310 that includes proxy 314, channel 318/342 and enclave 340 including bridge 344. The system 300 may permit flow of information in a direction of application-to-enclave, and also in an opposite direction of enclave-to-application.

Someclass method 312 is a caller attempting to access enclave object 346 via interface A 316. Proxy 314 instantiates (enclave) bridge2 326 and registers bridge2 326 with channel 318 (e.g., channel 318 assigns an index of bridge2 326 and returns the index to proxy 314). Interface A 316 has a method A1 that takes (untrusted) object 320 as a first parameter and object A 322 as a second parameter. Object A 322 is annotated by @structure. Data from object A 322 is packaged by proxy 314 into a contiguous buffer along with the index of bridge2 326, e.g., bridge2 326 is the bridge of (untrusted) object 320 (e.g., object 320 is accessible via bridge 2 326) and the packaged data is handed to channel 318, including an index (supplied by proxy 314) identifying a complementary bridge 344. Channel 342 receives the packaged data and uses the index provided to locate enclave bridge 344. Additionally, the enclave bridge 344 is informed that method A1 is being used. The enclave bridge 344 creates a copy of object A 350 from the packaged data received. The enclave bridge 344 invokes method A1 of enclave object 346, and the method A1 operates on the copy of object A 350 as a parameter, and proxy 352 as another parameter. The enclave bridge 344 creates (instantiates) proxy 352 by providing the channel 342 and the index associated with enclave bridge2 326 to a constructor of proxy 352.

Proxy 314 packages two pieces of information—first is contents of object A 322, and second is the identifier of enclave bridge2 326, e.g., identifies the address of the enclave bridge2 326 that is stored in an array within channel 318. The identifier can enable tracking, in application 310, of progress of data processing by the enclave object 346.

Proxy 314 instantiates enclave bridge2 326 and registers an address of enclave bridge2 326 with channel 318. Proxy 314 can pass the identifier of enclave bridge2 326 to enclave bridge 344. Thus, enclave bridge 344 receives data stored in object A 322 and the identifier associated with the address of enclave bridge2 326.

Enclave object 346 implements interface A 316 (e.g., a set of virtual functions) that a caller can call into to monitor processing of the data of Object A by enclave object 346. The identifier of 326 along with a reference to the channel 342 is used to instantiate an untrusted proxy 352.

Enclave object 346 may report on the progress of processing to proxy 352 by calling into proxy 352 and providing a percentage completion (e.g., from a marshaling buffer (not shown)). Proxy 352 will then send both pieces of data, e.g., bridge identifier of enclave bridge2 326 and the contents of the marshaling buffer, e.g., percentage completion of processing being executed by enclave object 346. Enclave bridge2 326 extracts (unmarshals) the percentage, calls into (untrusted) object 320, and provides contents of the unmarshaled data, (e.g., percentage completion of processing being executed by enclave object 346).

Figure 4:
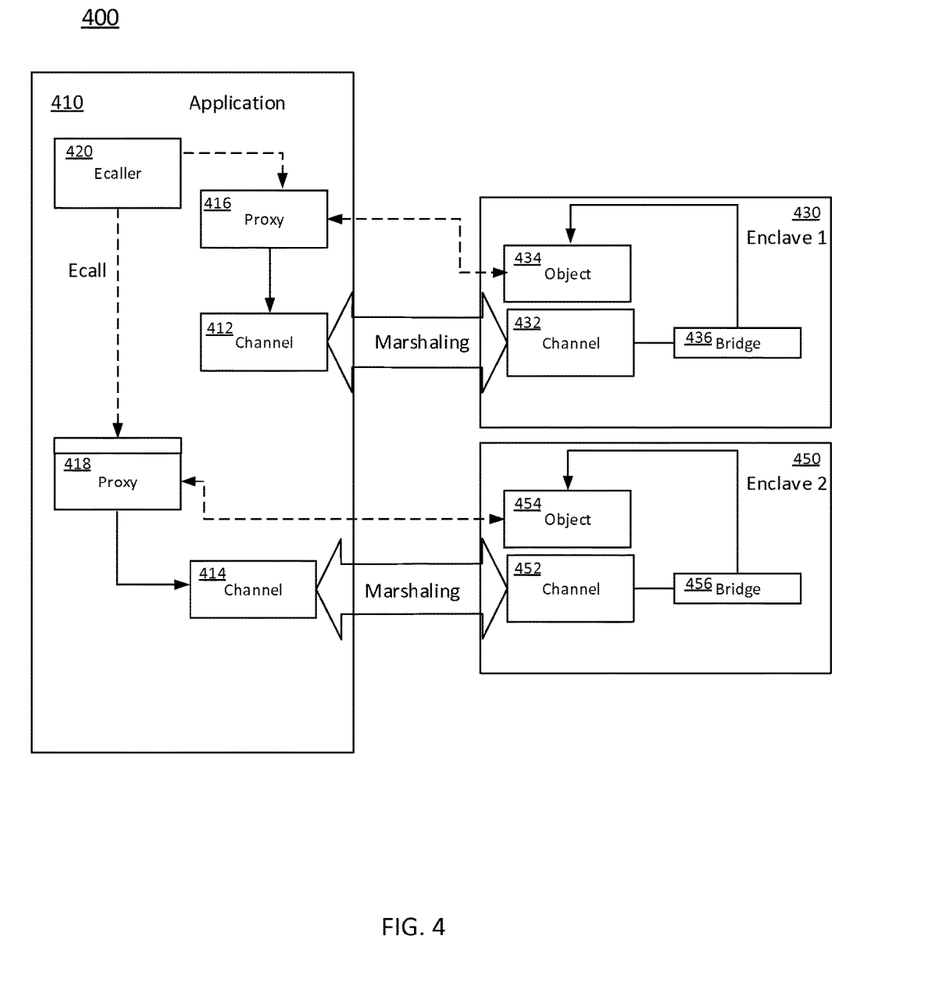
FIG. 4 is a block diagram of a system that includes two enclaves hosted by a single application, according to an embodiment of the present invention.

FIG. 4 is a block diagram of a system that includes two enclaves, according to an embodiment of the present invention. The enclaves 430 and 450 may be loaded via an enclave loader that may be generated at build time by, e.g., an annotation processor responsive to one or more annotations in source code of a source code application. An application 410 is in communication with two remote processes. The application 410 has interfaces to enclave 430 and enclave 450. For each of the enclaves 430, 450, there is a corresponding channel 412, 414 instantiated in the application as well as a corresponding channel 432, 452 instantiated in each of the enclaves 430, 450. Enclave 430 includes class object 434. Proxy 416 and bridge 436 exist to proxy an interface to object 434. Enclave 450 includes class object 454. A proxy 418 and bridge class 456 exist to proxy an interface to object 454. A piece of code ("ecaller") 420 may make a call to either object (434, 452) by calling through the corresponding proxy (416, 418). The proxy 416 and bridge 436 and/or the proxy 418 and bridge 456 may be created by, e.g., enclave initialization code that is output by a compiler through use of an annotation processor called by the compiler, according to embodiments of the present invention.

Figure 5:
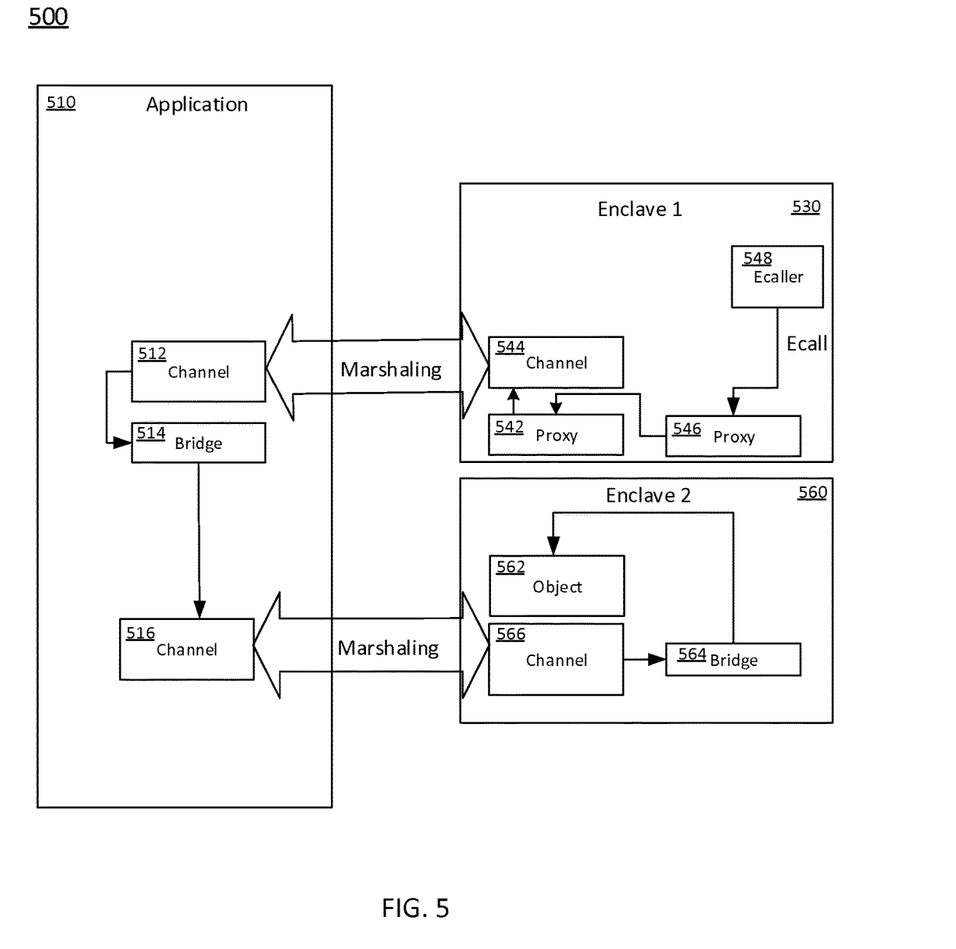
FIG. 5 is a block diagram of a system including a stackable channel configuration, according to an embodiment of the present invention.

FIG. 5 is a block diagram of a system including a stackable channel configuration, according to an embodiment of the present invention. The system 500 includes an application 510, a first enclave 530, and a second enclave 560. The system features stackable channels, which involves marshaling one channel over another channel and allows a remote entity to effectively call through two channels to reach another process. Through use ecaller 548, enclave 530 can call through the stacked channel interfaces to reach an object in enclave 560. In some embodiments, one or both of the enclaves 530, 560, may be created by an auto-generated enclave creator that is generated at build time of the application 510.

For each enclave, there is a corresponding channel instantiated in application 510 and in the enclave. That is, a channel 512 has a corresponding channel 544 in enclave 530, and a channel 516 has a corresponding channel 566 in enclave 560. Enclave 560 includes an object 562.

A proxy 542 is instantiated in enclave 530 and uses channel 512/544 between the application 510 and enclave 530 to marshal data to a bridge 514 located in the application 510.

A proxy 546 is created in enclave 530. Through the proxy 546, a channel call can be made through the channel 516/566 that communicates to enclave 560, and then to object 562 as follows: Ecaller 548, located in enclave 530, initiates a call to the object 562. The call proceeds to proxy 546, to proxy 542, through channel pair 544/512, to bridge 514, through channel pair 516/566, to bridge 564 in enclave 560, and finally from the bridge 564 to the object 562.

It should be noted that because the channel interfaces 512/544 and 516/566 are stacked, parameters of method calls are marshaled in the proxy of the process that originates the call (e.g., proxy 546), and then are un-marshaled in the bridge that terminates the call (e.g., bridge 564). There may be negligible overhead in the re-marshaling of parameters due to the stacking of the channel interfaces.

It is to be noted that the techniques presented in any of the preceding embodiments may be used to bridge an application to one or more other applications instead of bridging an application with an enclave.

Figure 6:
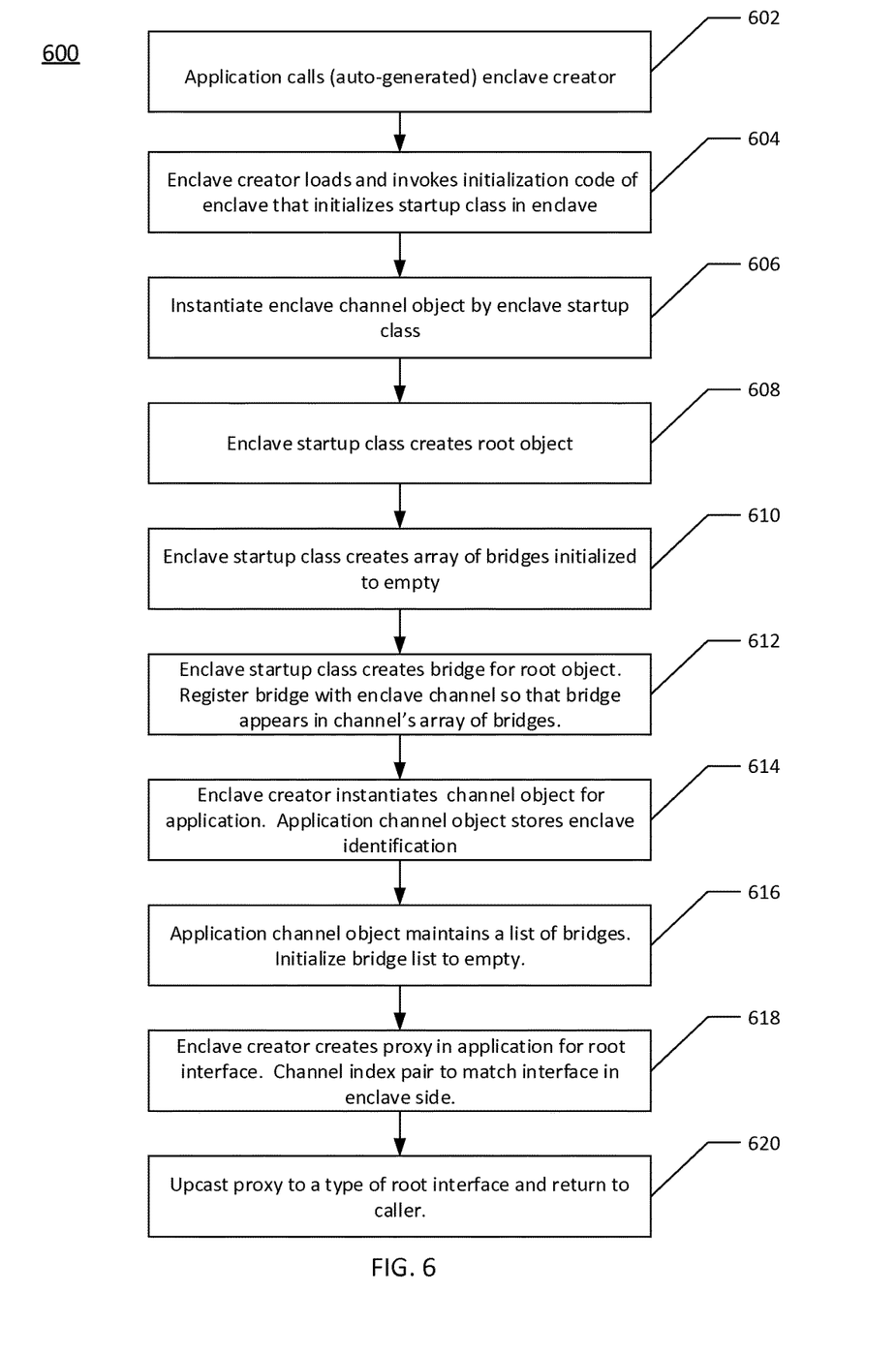
FIG. 6 is a flow diagram of a method to instantiate an interface between an application and an enclave, according to embodiments of the present invention.

FIG. 6 is a flow diagram of a method 600 to instantiate an interface between an application and an enclave, according to embodiments of the present invention. At block 602, the application calls an (auto-generated) enclave creator. In some embodiments (e.g., using Java® code) the enclave creator may be generated as a class with a static function, e.g., at build time of the application.

Continuing to block 604, the enclave creator loads and invokes initialization code of an enclave (e.g., in an application), which initializes a startup class in the enclave. Advancing to block 606, an enclave channel object is instantiated by the enclave startup class. Moving to block 608, the enclave startup class creates a root object. Proceeding to block 610, the enclave startup class creates an array of bridges, initialized to empty.

Continuing to block 612, the enclave startup class creates a bridge for the root object. The bridge is registered (e.g., assigned an assumed value for the root object, which is referenced in an array of the enclave channel) with the enclave channel so that the bridge appears in the channel's array of bridges. Advancing to block 614, the enclave creator instantiates an application channel object for the application. The application channel object stores an enclave identification. Moving to block 616, the application channel object maintains a list of bridges, initialized to empty. Proceeding to block 618, the enclave creator creates a proxy in the application, for a (single) root interface. A channel index pair is to match the interface in the enclave side. In an embodiment, the first channel index may be hard coded to one. Continuing to block 620, the proxy is upcast to a type of root interface and returned to a caller.

Figure 7:
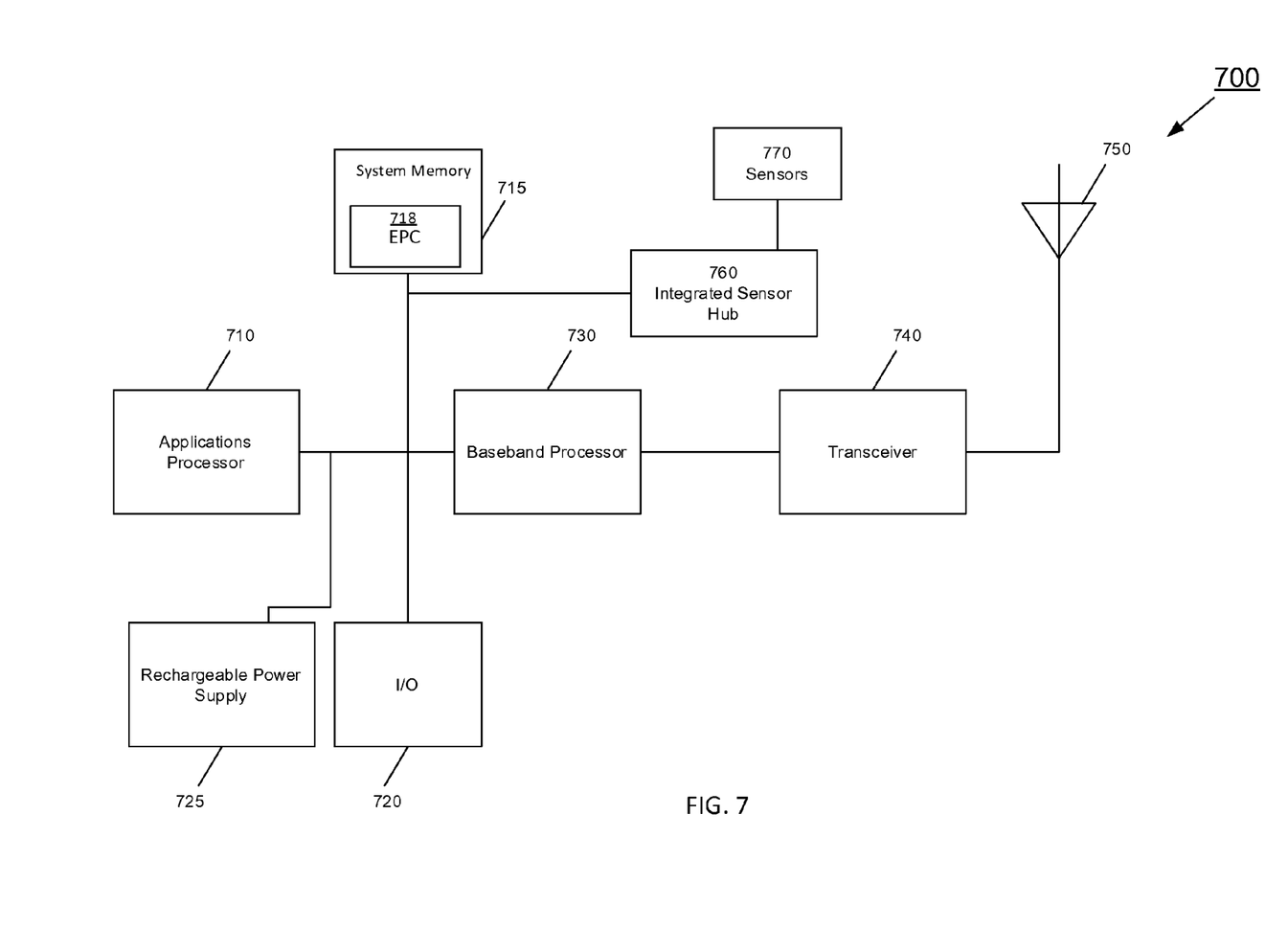
FIG. 7 is a block diagram of a system in accordance with another embodiment of the present invention.

Embodiments can be incorporated into other types of systems including mobile devices such as a cellular telephone. Referring now to FIG. 7, shown is a block diagram of a system in accordance with another embodiment of the present invention. As shown in FIG. 7, system 700 may be a mobile device and may include various components. As shown in the high level view of FIG. 7, an applications processor 710, which may be a central processing unit of the device, is in communication with various components, including a system memory 715. System memory 715, in various embodiments, may include both program and data storage portions and can be mapped to provide for secure storage. An "enclave page cache" (EPC) 718 is a dedicated portion of the storage 715 that may be dedicated, e.g., through use of cryptography, and may accommodate one or more secure enclaves to be created by, e.g., an application, according to embodiments of the present invention. In an embodiment, the EPC 718 may be configured at power-up and before the one or more secure enclaves are created.

Applications processor 710 may further be coupled to an input/output system 720, which in various embodiments may include a display and one or more input devices such as a touch keypad, which itself can appear on the display when executed. The system 700 may also include an integrated sensor hub (ISH) 760 that may receive data from one or more sensors 770.

The applications processor 710 may be operable execute an application to instantiate a root object for a secure enclave to which the application is to have access, according to embodiments of the present invention. The applications processor 710 may be operable to create marshaling code to marshal an interface between the application and the enclave, according to embodiments of the present invention. The marshaling code may be generated and invoked statically, according to embodiments of the present invention. In-source annotation may be used to define remote (e.g., marshal-able) interfaces at build time of the application, in accordance with embodiments of the present invention. Interface inheritance may be supported, according to embodiments of the present invention.

In some embodiments, a wrapper class can be generated automatically by the annotation processor to bypass marshaling, e.g., in order to run secure enclave (SE)-enabled applications on non-SE enabled hardware without modifications to enclave startup source code, according to embodiments of the present invention. Stackable channels may be supported including marshaling a second channel to a second enclave over a first channel to a first enclave, to allow a remote entity to effectively call through two channels to reach another process, according to embodiments of the present invention.

Applications processor 710 also may couple to a baseband processor 730, which may condition signals such as voice and data communications for output, as well as conditioning incoming telephone and other signals. As seen, baseband processor 730 couples to a transceiver 740, which may enable both receive and transmit capabilities. In turn, transceiver 740 may be in communication with an antenna 750, e.g., any type of antenna capable of transmitting and receiving voice and data signals via one or more communication protocols such as via a wireless wide area network (e.g., a 3G or 4G network) and/or a wireless local area network, such as a BLUETOOTH™ or so-called WI-FI™ network in accordance with an Institute of Electrical and Electronics Engineers 802.11 standard. As seen, system 700 may further include a rechargeable power supply 725 having a rechargeable battery to enable operation in a mobile environment. While shown with this particular implementation in the embodiment of FIG. 7, the scope of the present invention is not limited in this regard.

Figure 8:
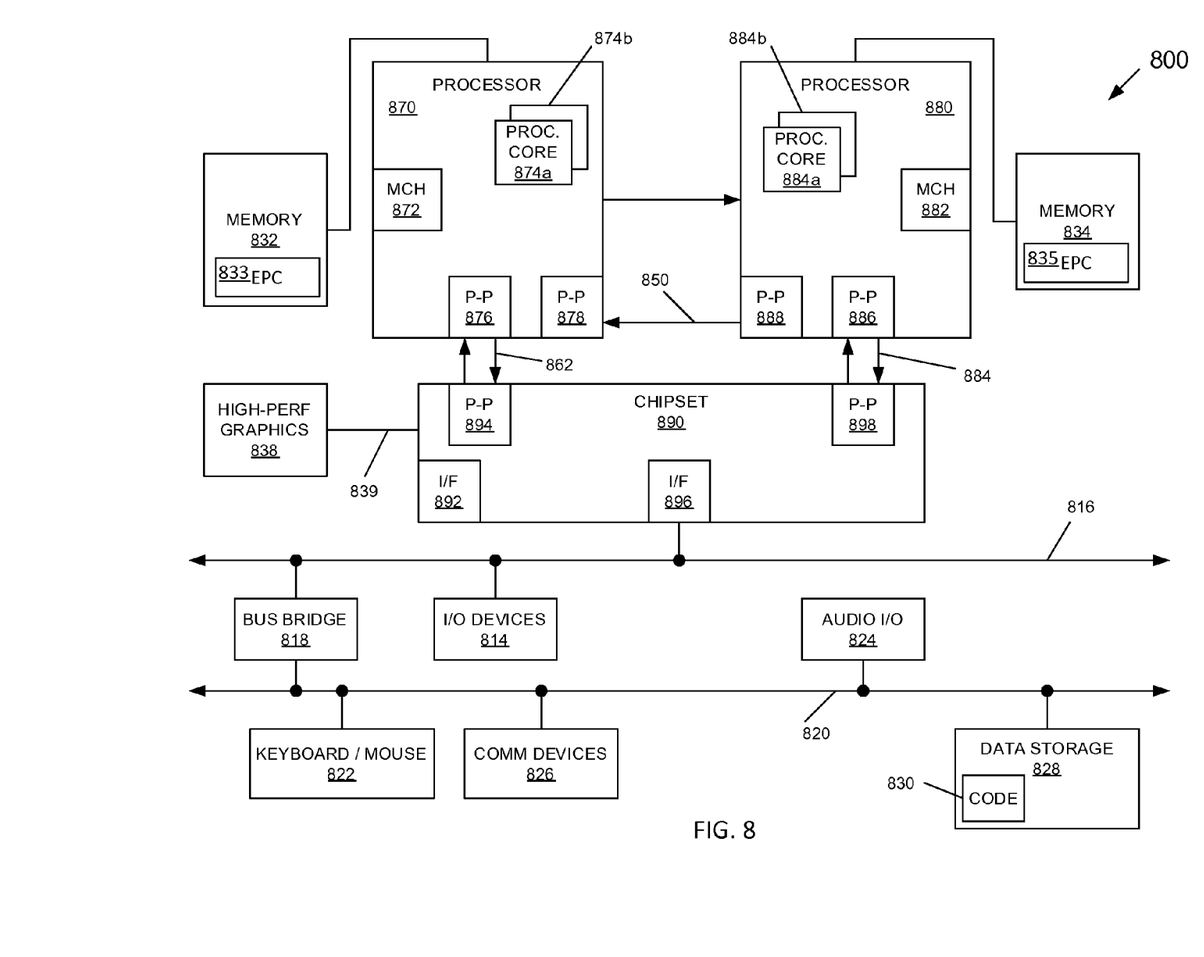
FIG. 8 is a block diagram of a system in accordance with another embodiment of the present invention.

Embodiments may be implemented in many different system types. Referring now to FIG. 8, shown is a block diagram of a system in accordance with an embodiment of the present invention. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors.

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCHs 872 and 882 couple the processors to respective memories, namely a memory 832 and a memory 834, which may be portions of system memory (e.g., DRAM) locally attached to the respective processors. The memory 832 may include an enclave page cache (EPC) 833, and the memory 834 may include an EPC 835. EPCs 833 and 835 are portions of the respective memory 832, 834. EPCs 833 and 835 may be dedicated (e.g., via cryptographic techniques) to store one or more secure enclaves. Each EPC 833, 835 may be created at power-up, e.g., by a basic input output system (BIOS) run by the respective processor 870, 880. One or more secure enclaves may be created by enclave loader in response to a request from an application run on processor 870 or processor 880, according to embodiments of the present invention. The secure enclave(s) may be created in the corresponding EPC, according to embodiments of the present invention. Each secure enclave may be abstracted as a root object instantiated automatically by enclave initialization code of the application at run time, according to embodiments of the present invention. The enclave initialization code may be generated at build time of the application, according to embodiments of the present invention.

First processor 870 and second processor 880 may be coupled to a chipset 890 via P-P interconnects 862 and 884, respectively. As shown in FIG. 8, chipset 890 includes P-P interfaces 894 and 898.

Furthermore, chipset 890 includes an interface 892 to couple chipset 890 with a high performance graphics engine 838 via a P-P interconnect 839. In turn, chipset 890 may be coupled to a first bus 816 via an interface 896. As shown in FIG. 8, various input/output (I/O) devices 814 may be coupled to first bus 816, along with a bus bridge 818, which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio input/output (I/O) 824 may be coupled to second bus 820. Embodiments can be incorporated into other types of systems including mobile devices such as a smart cellular telephone, tablet computer, netbook, Ultrabook™, or so forth.

Other embodiments are described below.

In one example, a system includes a processor to automatically execute enclave initialization code within a host application at run time of the host application. The enclave initialization code includes marshaling code to create a secure enclave separate from the host application, the marshaling code generated at build time of the host application. The system also includes a dynamic random access memory (DRAM) including a dedicated DRAM portion to store the secure enclave.

In an example, the enclave initialization code defines a remote interface between the host application and the secure enclave.

In an example, the processor is to marshal data between the host application and the secure enclave via a proxy/bridge pair.

In an example, the processor is to automatically instantiate a proxy via execution of the enclave initialization code. The proxy is to enable the host application to communicate with the secure enclave.

In an example, the proxy is operable to package one or more parameters for transportation to the secure enclave responsive to a method that is called.

In an example, the processor is further to instantiate a bridge that is operable to unpack the one or more parameters received at the secure enclave.

In an example, the processor is further to abstract a transportation layer as a first channel interface. The transportation layer is operable to match the proxy with the bridge.

In an example, the processor is to instantiate a second channel interface between the host application and a second secure enclave, and to stack the first channel interface and the second channel interface to enable an inter-enclave procedure call between the secure enclave and the second secure enclave.

In an example, execution of the enclave initialization code instantiates a root object that serves as an entry point of the secure enclave.

In an example, that incorporates any one of the above examples, the enclave initialization code is based on source code that includes an in-source annotation to indicate one or more marshalable data structures.

In another example, a method includes compiling, by compiler logic, source code that includes one or more annotations to produce enclave initialization code at build time of the host application. The enclave initialization code includes marshaling code to create a secure enclave separate from the host application at run time of the host application.

In an example, the method includes, when an annotation is encountered by the compiler logic, invoking by the compiler logic an annotation processor to determine marshalability of an annotated interface associated with the annotation.

In an example, the method includes generating by the annotation processor invoked by the compiler logic, the marshalling code when the annotation processor determines that the annotated interface is marshalable.

In an example, at run time the marshalling code is to place a proxy class into the host application to marshal a method call and the marshaling code is to place a bridge class in the secure enclave to un-marshal the method call.

In an example, an apparatus may perform any one of the above-described methods.

In an example, at least one machine readable medium includes instructions that in response to being executed on a computing device, cause the computing device to carry out any one of the above-described methods.

An example includes a means for performing any one of above-described methods.

In another example, a system includes a processor to enable a call from a first secure enclave to a root object of a second secure enclave via a first channel interface between a host application and the first secure enclave, and subsequently via a second channel interface between the host application and the second secure enclave. The system also includes a dynamic random access (DRAM) memory to store the first secure enclave.

In an example, the processor is to instantiate a first proxy/bridge pair corresponding to the first channel interface and a second proxy/bridge pair corresponding to the second channel interface.

In an example, each of the first proxy/bridge pair and the second proxy/bridge pair are instantiated at run time of the host application.

In an example, the processor is to marshal data between the first secure enclave and the host application via the first proxy/bridge pair that includes a first proxy and a first bridge. The host is further to marshal the data between the host application and the second secure enclave via the second proxy/bridge pair that includes a second proxy and a second bridge.

In an example, the data is marshaled in the first proxy and is unmarshaled in the second bridge without unmarshaling the data in the first bridge.

In an example, the processor is further to instantiate the root object of the second secure enclave during run time of the host application.

In another example, at least one computer readable storage medium has instructions stored thereon for causing a system to instantiate a root object to enable a secure enclave (SE)-enabled application to run on non-SE-enabled hardware by execution of an enclave creator that is automatically generated from compilation of source code responsive to at least one annotation in the source code. The root object is to be instantiated at run time of the SE-enabled application.

In an example, enablement of the SE-enabled application to run on non-secure enabled hardware permits access to the secure enclave without use of a bridge to marshal parameters associated with the SE-enabled application.

In an example, the at least one computer readable storage medium includes instructions to, upon instantiation of the root object, return a root interface to a caller of the SE-enabled application without instantiation of a proxy or instantiation of a bridge.

In an example, the at least one computer readable storage medium includes instructions to detect, by a compiler during build time of object code, a first annotation in source code that is being interpreted by the compiler and to invoke an annotation processor to generate marshaling code at build time based on the first annotation.

In another example, at least one computer readable storage medium has instructions stored thereon for causing a system to execute enclave initialization code that has been created at build time of a host application from source code that includes one or more annotations. The enclave initialization code includes marshaling code to create a secure enclave separate from the host application at run time of the host application.

In an example, at run time the marshalling code is to place a proxy class into the host application to marshal a method call and the marshaling code is to place a bridge class in the secure enclave to un-marshal the method call.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
a processor having a plurality of cores, the processor to automatically execute enclave initialization code included within a host application at run time of the host application, wherein the enclave initialization code includes marshaling code to create a secure enclave separate from the host application, the secure enclave comprising a root object to expose a root interface having a proxy/bridge pair, the enclave initialization code to create the root object and the proxy/bridge pair at run time, the root object to serve as an entry point to the secure enclave; and
a dynamic random access memory (DRAM) including a dedicated DRAM portion to store the secure enclave.

2. The system of claim 1, wherein the enclave initialization code defines a remote interface between the host application and the secure enclave.

3. The system of claim 1, wherein the processor is to marshal data between the host application and the secure enclave via the proxy/bridge pair.

4. The system of claim 1, wherein the processor is to automatically instantiate a proxy via execution of the enclave initialization code, the proxy to enable the host application to communicate with the secure enclave.

5. The system of claim 4, wherein the proxy is operable to package one or more parameters for transportation to the secure enclave responsive to a method that is called.

6. The system of claim 5, wherein the processor is further to instantiate a bridge that is operable to unpack the one or more parameters received at the secure enclave.

7. The system of claim 1, wherein the processor is to abstract a transportation layer as a first channel interface, wherein the transportation layer is operable to match a proxy of the proxy/bridge pair with a bridge of the proxy/bridge pair.

8. The system of claim 7, wherein the processor is further to:
instantiate a second channel interface between the host application and a second secure enclave; and
stack the first channel interface and the second channel interface to enable an inter-enclave procedure call between the secure enclave and the second secure enclave.

9. The system of claim 1, wherein the enclave initialization code is based on source code that includes in-source annotation to indicate one or more marshalable data structures.

10. The system of claim 1, wherein execution of the enclave initialization code is to instantiate the root object that serves as the entry point to the secure enclave.

11. A system comprising:
a processor having a plurality of cores, the processor to enable a call from a first secure enclave to a root object of a second secure enclave via a first channel interface between a host application and the first secure enclave, and subsequently via a second channel interface between the host application and the second secure enclave, the first secure enclave comprising a root object to expose a root interface having a proxy/bridge pair to be created at run time by enclave initialization code, the enclave initialization code included within the host application; and
a dynamic random access (DRAM) memory to store the first secure enclave.

12. The system of claim 11, wherein the processor is to instantiate a first proxy/bridge pair corresponding to the first channel interface and a second proxy/bridge pair corresponding to the second channel interface.

13. The system of claim 12, wherein each of the first proxy/bridge pair and the second proxy/bridge pair are to be instantiated at run time of the host application.

14. The system of claim 12, wherein the processor is to:
marshal data between the first secure enclave and the host application via the first proxy/bridge pair that comprises a first proxy and a first bridge; and
marshal the data between the host application and the second secure enclave via the second proxy/bridge pair that comprises a second proxy and a second bridge.

15. The system of claim 14, wherein the data is marshaled in the first proxy and is unmarshaled in the second bridge without unmarshaling the data in the first bridge.

16. The system of claim 11, wherein the processor is further to instantiate the root object of the second secure enclave during run time of the host application.

17. At least one non-transitory computer readable storage medium having instructions stored thereon for causing a system to:
execute enclave initialization code included within a host application;
wherein the enclave initialization code includes marshaling code to create a secure enclave separate from the host application, the secure enclave comprising a root object to expose a root interface having a proxy/bridge pair to be created by the enclave initialization code, the root object to serve as an entry point to the secure enclave, the system comprising a microprocessor and a memory.

18. The at least one non-transitory computer readable storage medium of claim 17, wherein the marshaling code is to place a proxy class into the host application to marshal a method call and place a bridge class in the secure enclave to un-marshal the method call.

* * * * *